United States Patent
Kawalkar

(10) Patent No.: US 8,719,724 B2
(45) Date of Patent: May 6, 2014

(54) METHOD FOR ENLARGING CHARACTERS DISPLAYED ON AN ADAPTIVE TOUCH SCREEN KEY PAD

(75) Inventor: Amit Nishikant Kawalkar, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 286 days.

(21) Appl. No.: 13/049,664

(22) Filed: Mar. 16, 2011

(65) Prior Publication Data

US 2012/0240069 A1 Sep. 20, 2012

(51) Int. Cl.
*G06F 3/048* (2013.01)

(52) U.S. Cl.
USPC .................. 715/773; 715/815; 715/816

(58) Field of Classification Search
USPC .................. 715/767, 771, 773, 815, 816
See application file for complete search history.

(56) References Cited

U.S. PATENT DOCUMENTS

| | | | |
|---|---|---|---|
| 5,748,512 A * | 5/1998 | Vargas | 708/142 |
| 5,963,671 A | 10/1999 | Comerford et al. | |
| 6,271,835 B1 | 8/2001 | Hoeksma | |
| 6,573,844 B1 | 6/2003 | Venolia et al. | |
| 6,724,370 B2 | 4/2004 | Dutta et al. | |
| 7,336,263 B2 | 2/2008 | Valikangas | |
| 7,372,454 B2 | 5/2008 | Betts-LaCroix | |
| 7,453,441 B1 | 11/2008 | Iorfida et al. | |
| 7,479,949 B2 | 1/2009 | Jobs et al. | |
| 7,487,147 B2 | 2/2009 | Bates et al. | |
| 7,716,579 B2 | 5/2010 | Gunn et al. | |
| 8,312,373 B2 * | 11/2012 | Kraft et al. | 715/702 |
| 8,335,993 B1 * | 12/2012 | Tan | 715/773 |
| 2005/0268247 A1 * | 12/2005 | Baneth | 715/781 |
| 2006/0228149 A1 * | 10/2006 | Harley | 400/486 |
| 2010/0026650 A1 | 2/2010 | Srivastava et al. | |
| 2010/0115448 A1 * | 5/2010 | Lysytskyy et al. | 715/773 |
| 2010/0164897 A1 | 7/2010 | Morin et al. | |
| 2010/0265181 A1 | 10/2010 | Shore | |
| 2010/0315266 A1 | 12/2010 | Gunawardana et al. | |
| 2012/0047454 A1 * | 2/2012 | Harte | 715/773 |

FOREIGN PATENT DOCUMENTS

WO 2011001361 A1 1/2011

OTHER PUBLICATIONS

EP Search Report for Application No. EP 12 159 129.1 dated Oct. 8, 2013.

* cited by examiner

*Primary Examiner* — Weilun Lo
*Assistant Examiner* — Dino Kujundzic
(74) *Attorney, Agent, or Firm* — Ingrassia Fisher & Lorenz, P.C.

(57) ABSTRACT

Selected adaptive touch screen key pad characters not existing in a list of possible available character strings are removed from the touch screen key pad and the space occupied by the remaining characters on the key pad and their character size (font) are enlarged, making their recognition and selection by a user much easier. The method includes detecting selection of a button displaying at least one of the selectable characters; creating at least one character substring, one for each of the one or more selectable characters displayed on the selected button; identifying selectable characters on the touch screen not included in the one or more character strings; removing the identified selectable characters from the touch screen; and enlarging the selectable characters remaining on the touch screen.

16 Claims, 6 Drawing Sheets

METHOD FOR ENLARGING CHARACTERS DISPLAYED ON AN ADAPTIVE TOUCH SCREEN KEY PAD

FIELD

The present invention generally relates to displaying symbols represented by alphanumeric labels or graphic icons, and more particularly to the enlargement of alphanumeric characters on an adaptive touch screen having one or more alphanumeric character on each key.

BACKGROUND

Many electronic devices, such as aircraft flight deck operational equipment including touch screens, receive input from the aircrew. A touch panel offers intuitive inputting for a computer or other data processing devices. It is especially useful in aircraft cockpit devices where other input devices, such as a keyboard and a mouse, are not readily available.

Touch screens are increasingly being used in the cockpit instead of cursor control devices (CCDs), hard knobs and switches, and hardware keyboards. For alphanumeric input using a touch screen, a virtual keyboard is typically displayed, and the user touches the appropriate keys analogous to pushing keys on a real keyboard. However, many of the known screens particularly suited for low end general aviation applications are relatively small, for example, a key width of about 9 millimeters with 2 millimeters spacing therebetween, and the use of a full keyboard makes each key so small that unacceptable accuracy of the touch may occur, especially during turbulence or with the use of gloves by the aircrew. These known touch panels may require the aircrew's attention over an inordinate amount of time, thereby distracting them from performing other flight duties.

There are many types of touch screen sensing technologies, including capacitive, resistive, infrared, and surface acoustic wave. All of these technologies sense touches on a screen. U.S. Pat. No. 6,492,979 discloses the use of a combination of capacitive touch screen and force sensors. U.S. Pat. No. 7,196,694 discloses the use of force sensors at the peripherals of the touch screen to determine the position of a touch. US patent publication 2007/0229464 discloses the use of a capacitive force sensor array overlaying a display to form a touch screen.

World wide air traffic is projected to double every ten to fourteen years, and the International Civil Aviation Organization (ICAO) forecasts world air travel growth of five percent per annum until the year 2020. Such growth may cause degradation in safety and performance and an increase in an already high workload of the flight crew. One negative influence on flight performance has been the ability for the aircrew to input data while paying attention to other matters within and outside of the cockpit. The ability to easily and quickly input data can significantly improve situational awareness of the flight crew resulting in increased flight safety and performance by reducing the flight crew workload.

Accordingly, it is desirable to provide a method for inputting alphanumeric characters, symbols, or menu items from a plurality of such on a small touch screen having keys sufficiently large for accurate selection. Furthermore, other desirable features and characteristics of the present invention will become apparent from the subsequent detailed description of the invention and the appended claims, taken in conjunction with the accompanying drawings and this background of the invention.

BRIEF SUMMARY

A touch screen and method of enlarging the size of characters on the touch screen is described that increases the likelihood of a user recognizing and selecting the desired touch screen character.

A first method for enlarging a plurality of selectable characters displayed on a plurality of buttons on a touch screen includes selecting a button displaying at least one of the selectable characters; creating at least one character substring, one for each of the one or more selectable characters displayed on the selected button; identifying selectable characters on the touch screen not included in the one or more character strings; removing the identified selectable characters from the touch screen; and enlarging the selectable characters remaining on the touch screen.

A second method for enlarging selectable characters displayed on a touch screen includes determining one or more characters selected from the touch screen by a touch; creating at least one character substring, one for each of the one or more selectable characters displayed on the selected button; identifying characters on the touch screen not included in the list of strings; removing the identified characters from the touch screen; and enlarging the characters remaining on the touch screen.

A touch screen enabling the exemplary embodiments includes a plurality of buttons, each button containing at least one touch sensitive region, each touch sensitive region displaying a character; a processor configured to sense the selection of one of the touch sensitive regions; determine which character strings in a list of stored character strings end with the character displayed on the selected touch sensitive region selected; disable touch sensitive regions displaying characters not included in the character strings; and enlarge other touch sensitive regions remaining on the touch screen.

BRIEF DESCRIPTION OF THE DRAWINGS

The present invention will hereinafter be described in conjunction with the following drawing figures, wherein like numerals denote like elements.

DETAILED DESCRIPTION

Figure 1:
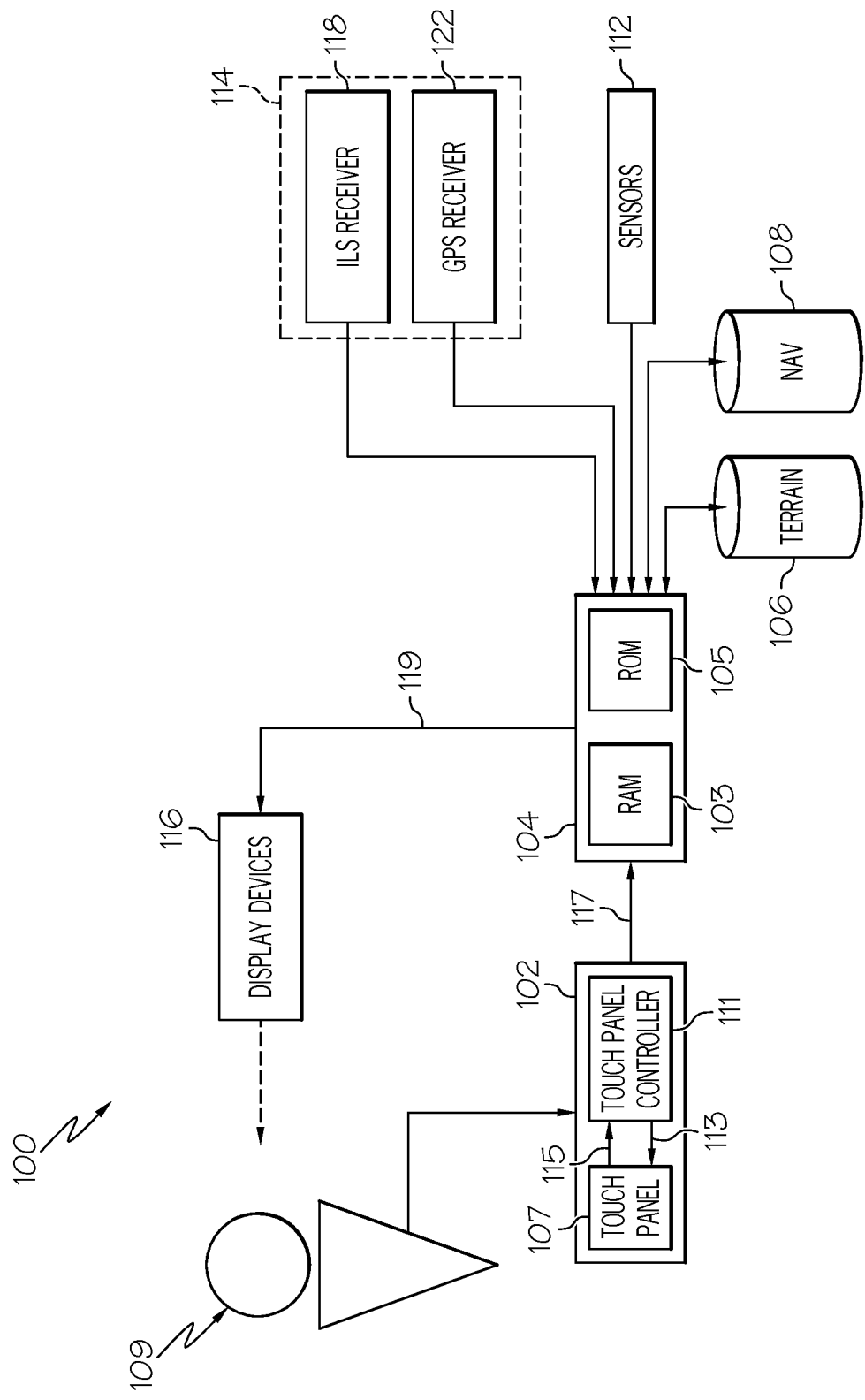
FIG. 1 is a block diagram of a known aircraft system including a touch screen for presenting a keyboard containing a plurality of keypads.

The following detailed description of the invention is merely exemplary in nature and is not intended to limit the invention or the application and uses of the invention. Furthermore, there is no intention to be bound by any theory presented in the preceding background of the invention or the following detailed description of the invention.

A keyboard touch screen is disclosed having a plurality of displayed keys, or buttons, each key containing at least one character. "Characters", as used herein, is defined to include alphanumeric characters, icons, signs, words, terms, phrases, or the like, and combinations thereof. While the embodiments disclosed herein may be applied to any touch screen keyboard in any application or environment, they apply well to key pads used in the aviation industry, which is the basis for the following description of the exemplary embodiments. A database contains a character list of possible selections. These character lists may be an identifier for any type of desired selection, but in the preferred embodiments, may be aircraft navigation aids, way points for a route of flight, airports, and the like. When a button containing one or more characters is selected, the one or more characters become a character string or strings, or is/are appended to an existing character string. Characters on the keyboard not existing in the character string or strings are removed and the remaining characters are enlarged, thereby filling some or all of the space previously occupied by the removed characters.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Referring to FIG. 1, a flight deck display system 100 includes a user interface 102, a processor 104, one or more terrain databases 106 sometimes referred to as a Terrain Avoidance and Warning System (TAWS), one or more navigation databases 108, various sensors 112, various external data sources 114, and one or more display devices 116. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, one or more buttons, switches, or knobs (not shown). In the depicted embodiment, the user interface 102 includes a touch panel 107 and a touch panel controller 111. The touch panel controller 111 provides drive signals 113 to a touch panel 107, and a sense signal 115 is provided from the touch panel 107 to the touch panel controller 111, which periodically provides a signal 117 of the distribution of pressure to the processor 104. The processor 104 interprets the controller signal 117, and provides, for example, a signal 119 to the displays 116. Therefore, the user 109 uses the touch panel 107 to input alphanumeric data as more fully described hereinafter.

The processor 104 may be any one of numerous known general-purpose microprocessors or an application specific processor that operates in response to program instructions. In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. The software executing the exemplary embodiment is stored in either the ROM 105 or the RAM 103. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

The memory 103, 105 may be realized as RAM memory, flash memory, EPROM memory, EEPROM memory, registers, a hard disk, a removable disk, a CD-ROM, or any other form of storage medium known in the art. In this regard, the memory 103, 105 can be coupled to the processor 104 such that the processor 104 can read information from, and write information to, the memory 103, 105. In the alternative, the memory 103, 105 may be integral to the processor 104. As an example, the processor 104 and the memory 103, 105 may reside in an ASIC. In practice, a functional or logical module/component of the display devices 116 might be realized using program code that is maintained in the memory 103, 105. Moreover, the memory 103, 105 can be used to store data utilized to support the operation of the display devices 116, as will become apparent from the following description.

No matter how the processor 104 is specifically implemented, it is in operable communication with the terrain databases 106, the navigation databases 108, and the display devices 116, and is coupled to receive various types of inertial data from the various sensors 112, and various other avionics-related data from the external data sources 114, for example, a GPS receiver 122 and an ILS receiver 118. The processor 104 is configured, in response to the inertial data and the avionics-related data, to selectively retrieve terrain data from one or more of the terrain databases 106 and navigation data from one or more of the navigation databases 108, and to supply appropriate display commands to the display devices 116. The display devices 116, in response to the display commands, selectively render various types of textual, graphic, and/or iconic information. The preferred manner in which the textual, graphic, and/or iconic information are rendered by the display devices 116 will be described in more detail further below.

The terrain databases 106 include various types of data representative of the terrain over which the aircraft is flying, and the navigation databases 108 include various types of navigation-related data. The sensors 112 may be implemented using various types of inertial sensors, systems, and or subsystems, now known or developed in the future, for supplying various types of inertial data, for example, representative of the state of the aircraft including aircraft speed, heading, altitude, and attitude. The ILS receiver 118 provides aircraft with horizontal (or localizer) and vertical (or glide slope) guidance just before and during landing and, at certain fixed points, indicates the distance to the reference point of landing on a particular runway. The GPS receiver 122 is a multi-channel receiver, with each channel tuned to receive one or more of the GPS broadcast signals transmitted by the constellation of GPS satellites (not illustrated) orbiting the earth.

The display devices 116, as noted above, in response to display commands supplied from the processor 104, selectively renders various textual, graphic, and/or iconic information, and thereby supplies visual feedback to the user 109. It will be appreciated that the display devices 116 may be implemented using any one of numerous known display devices suitable for rendering textual, graphic, and/or iconic information in a format viewable by the user 109. Non-limiting examples of such display devices include various cathode ray tube (CRT) displays, and various flat panel displays such as various types of LCD (liquid crystal display) and TFT (thin film transistor) displays. The display devices 116 may additionally be implemented as a panel mounted display, a HUD (head-up display) projection, or any one of numerous known technologies. It is additionally noted that the display devices 116 may be configured as any one of numerous types of aircraft flight deck displays. For example, it may be configured as a multi-function display, a horizontal situation indicator, or a vertical situation indicator, just to name a few. In the depicted embodiments, however, one of the display devices 116 is configured as a touch screen.

Figure 2:
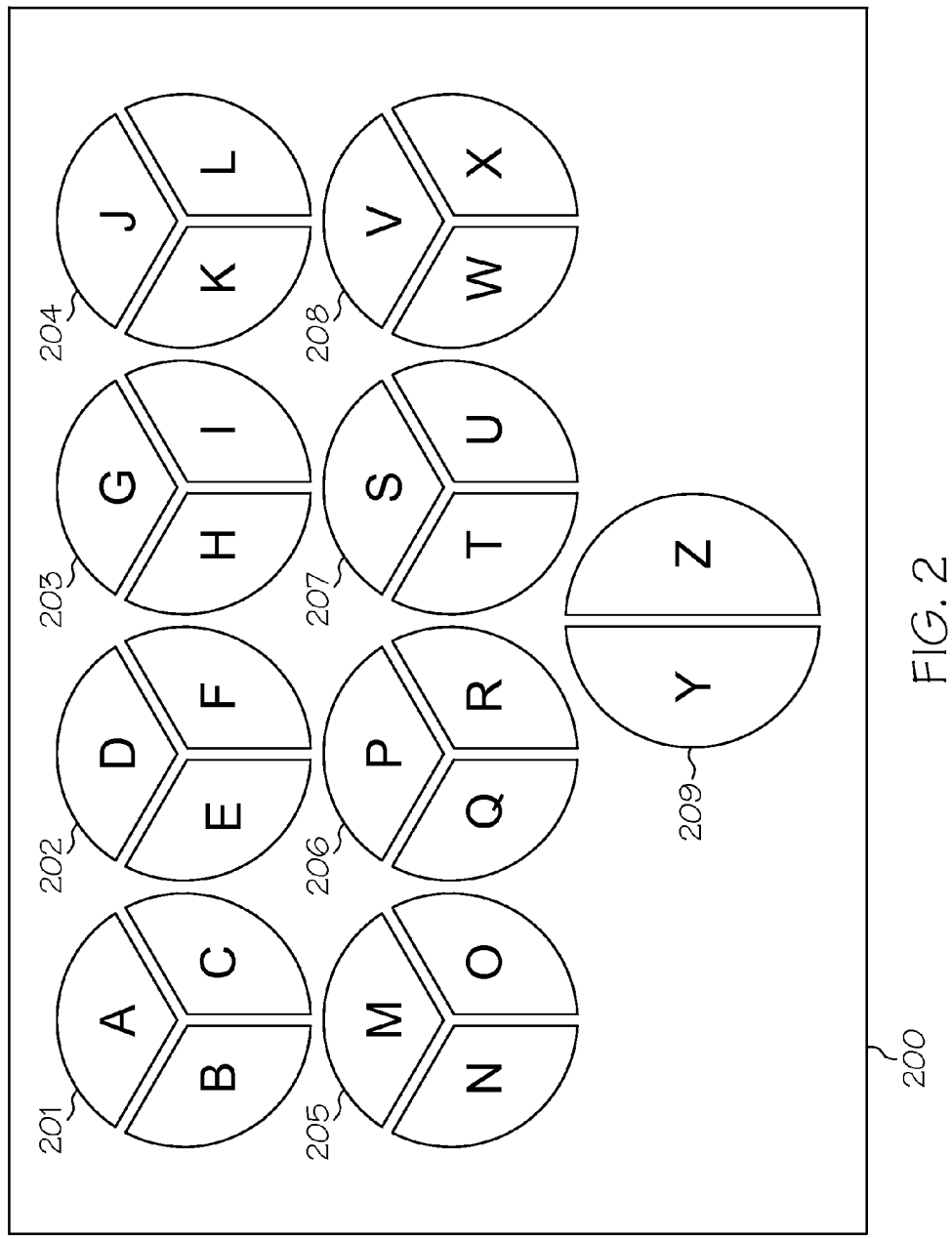
FIG. 2 is a diagram of a first exemplary embodiment of an alphanumeric keyboard on a touch screen.

In accordance with a first exemplary embodiment, an alphanumeric touch screen 200 is shown in FIG. 2 and includes displayed nine circular buttons, or keys, 201-209, each containing touch sensitive regions for displaying the characters A-Z as shown. The number of circular buttons 201-209 may number from one to a plurality. While the buttons 201-208 contain three touch sensitive regions and button 209 contains two touch sensitive regions, the buttons are not to be limited to such numbers and may contain a plurality of such touch sensitive regions defining characters. Furthermore, while alphabetic characters are illustrated in the above exemplary embodiment, the characters may be numbers, symbols, icons, signs, words, terms, and phrases, either alone or in combination, etc., in any language. In the preferred first embodiment, the diameter of each button is at least 26 millimeters with an interspacing between adjacent buttons of at least 2 millimeters. While the value of the described embodiments is especially high when implemented in small touch screens, it may also be utilized in larger touch screens.

Figure 3:
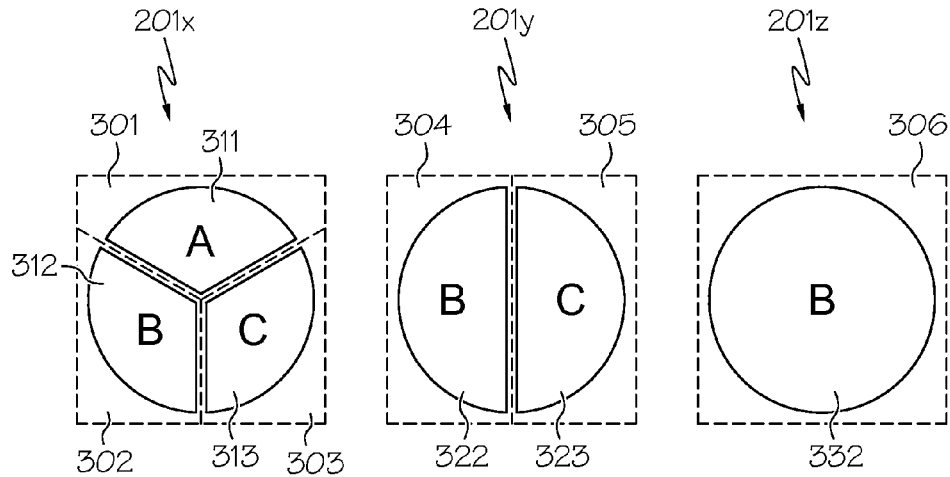
FIG. 3 is a diagram of one key pad of the alphanumeric keyboard of FIG. 3 modified in accordance with an exemplary embodiment.

Referring to FIG. 3, the displayed button 201 is shown at three levels of enlargement. Button 201$_X$ includes touch sensitive regions 301, 302, 303, containing the characters "A", "B", and "C", respectively. The touch sensitive regions 301, 302, 303 are larger than the displayed area 311, 312, 313 containing the characters "A", "B", and "C", respectively, to increase the likelihood of a user's touch being sensed. A user's touch to a particular portion (one of the touch sensitive areas 301, 302, 303) of button 201$_X$ would select one of the single characters "A", or "B" or "C" corresponding to the particular touched portion. It is noted that button 201 is referred to as button 201$_X$, 201$_Y$, and 201$_Z$ to designate steps in the selection method.

When a touch to the button 201$_X$ is sensed, the letters "A" or "B", or "C" each becomes a substring, are appended to an existing substring. A substring is one or more characters stored in a database in memory 105, representing an object or process, such as aircraft navigation aids, way points for a route of flight, airports, and the like in the described exemplary embodiments. For example, if the touch sensitive portion 301 containing the character "A" were touched, "A" would become a substring, or if an existing substring was "TU", the appended substring would be "TUA". Likewise, substrings "TUB" or "TUC" would be created if "B" or "C" were selected. The substring containing the selected character is then compared to the database containing a plurality of character strings. If character strings containing "B", and "C" were in a database of valid substrings, for example TUB and TUC, but no strings ending with the character "A" existed, then the touch sensitive region 301 containing the letter "A" is removed and the touch sensitive region 302 containing the character "B" and touch sensitive region 303 containing the character "C" are displayed in an enlarged format as shown on button 201$_Y$ as new touch sensitive regions 304 and 305, respectively. This method may be repeated. When one of the touch sensitive regions 304, 305 on button 201$_Y$ is touched, the corresponding letter "B" 322 or "C" 323, is appended to the existing substrings "A" and "TUA". For example, if the character "B" is selected, this would result in the substrings "AB" and "TUAB". If for example, no character strings exist in the database for "ABC" and "TUABC", then the "C" would be removed from the displayed button, and the touch sensitive area 304 for the character "B" would be displayed in a further enlarged format as shown in 201$_Z$ as touch sensitive region 306 containing the character "B" 332.

Figure 4:
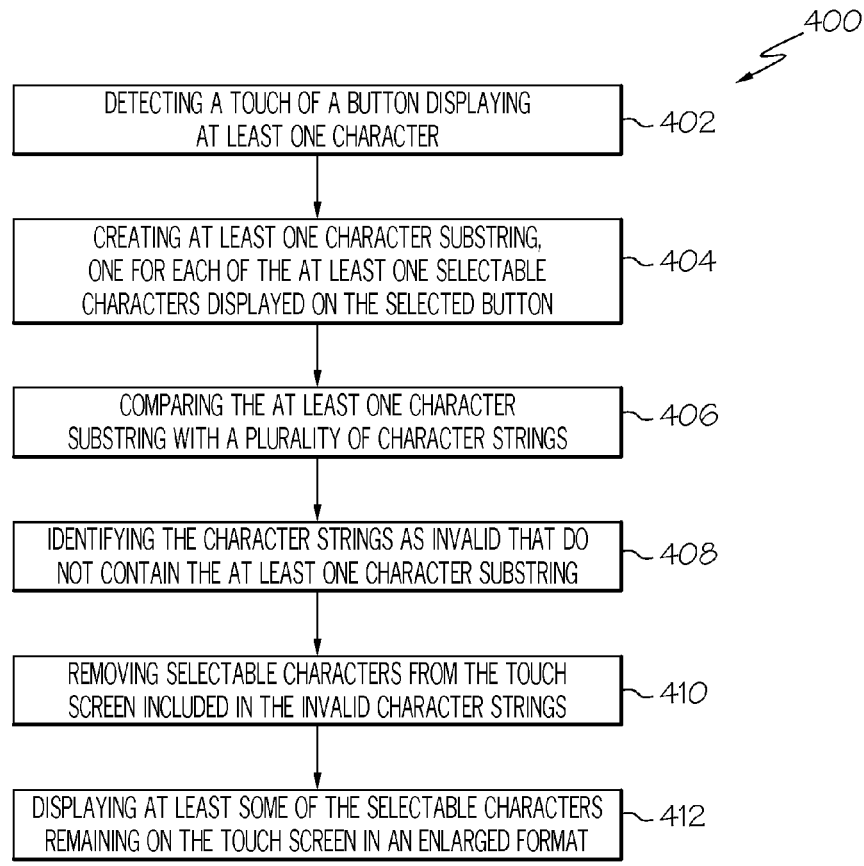
FIG. 4 is a flow chart of a method for modifying the touch pads of the alphanumeric keyboard in accordance with the exemplary embodiments.
Figure 5:
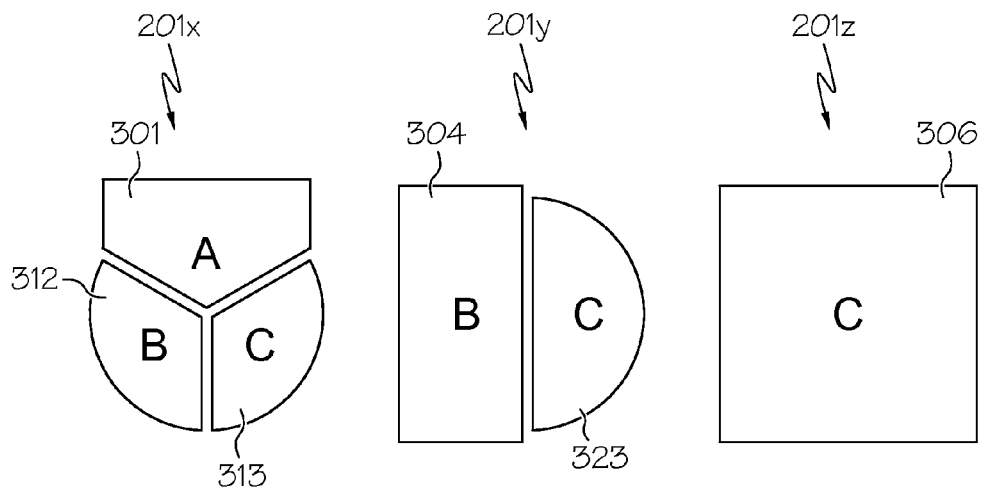
FIG. 5 is a diagram of one key pad of the alphanumeric keyboard of FIG. 3 further modified in accordance with another exemplary embodiment.

FIG. 4 is a flow chart that illustrates an exemplary embodiment of a display process 400 suitable for use with a flight deck display system such as the display system 100. Process 400 represents one implementation of a method for displaying characters on an onboard display element of a host aircraft. The various tasks performed in connection with process 400 may be performed by software, hardware, firmware, or any combination thereof. For illustrative purposes, the following description of process 400 may refer to elements mentioned herein in connection with FIGS. 3, 5-9. In practice, portions of process 400 may be performed by different elements of the described system, e.g., a processor, a display element, or a data communication component. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein. Moreover, one or more of the tasks shown in FIG. 4 could be omitted from an embodiment of the process 400 as long as the intended overall functionality remains intact.

A flow chart 400 of the steps in the method describing the various exemplary embodiments herein is described in FIG. 4 and includes a used detecting 402 a touch of a button displaying at least one character, and a processor creating 404 at least one character substring, one for each of the one or more selectable characters displayed on the selected button. These at least one character substring are then compared 406 with valid character strings (i.e., the character strings in the database). Selectable characters on the touch screen that do not contain the at least one character substring are identified 408 as invalid and removed 410 from the touch screen. The selectable characters remaining on the touch screen are then displayed 412 in an enlarged format in an area that the previously displayed character occupied.

Optionally, the touch sensitive region corresponding to an individual character selected is highlighted to provide visual feedback for selection. For example, in the examples of FIG. 5, touch sensitive regions 301, 304 and 306 are highlighted.

Figure 6:
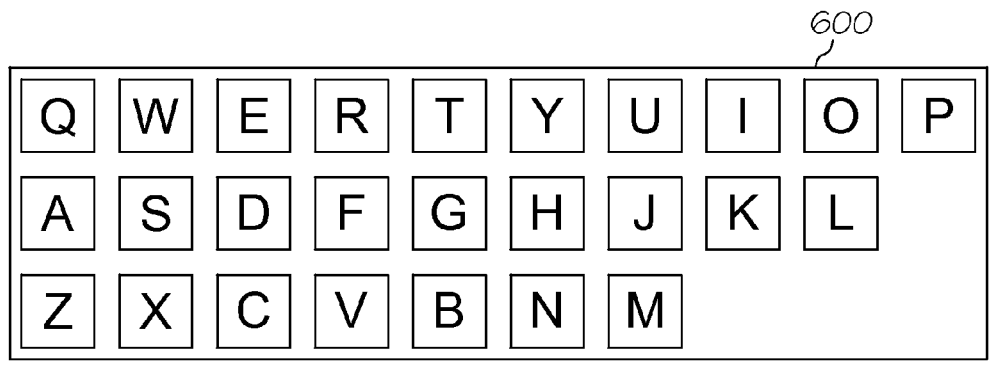
FIG. 6 is a diagram of an exemplary alphanumeric keyboard.
Figure 7:
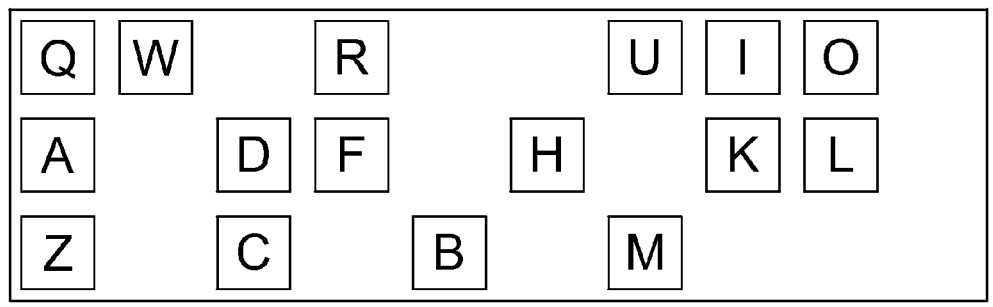
FIG. 7 is a diagram of a first version of the keyboard of FIG. 6 modified in accordance with a further exemplary embodiment.
Figure 8:
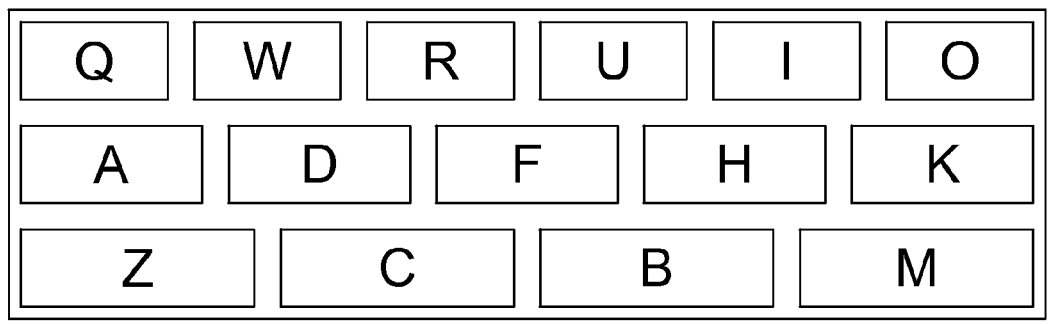
FIG. 8 is a diagram of a second modified version of the keyboard of FIG. 6 modified in accordance with yet a further exemplary embodiment.
Figure 9:
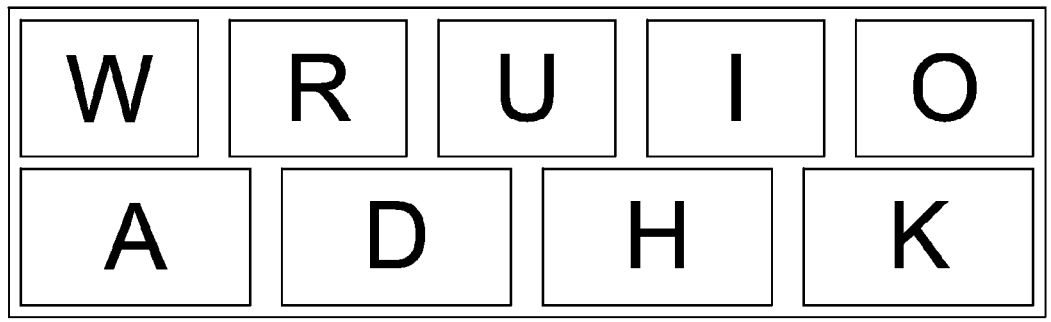
FIG. 9 is a diagram of a third modified version of the keyboard of FIG. 6 modified in accordance with still a further exemplary embodiment.

A second exemplary embodiment shown in FIGS. 6-8 includes a touch screen, or keyboard, 600 having twenty six buttons, or touch sensitive regions for each of the letters of the English alphabet. When one of the selectable buttons is touched, the button "R" for example, the letter "R" becomes a substring, or is appended to a previously stored, existing substring. For example, if there is no existing substring, the substring becomes "R" and is compared to a database containing a plurality of valid character strings. If there were no character strings starting with "R" and not containing at least one or more instances of "E", "T". "Y", "P", "S", "G", "J", "X", "V", and "M", for example, the buttons for the letters "E", "T", "Y", "P", "S", "G", "J", "X", "V", and "M" are removed as shown in FIG. 7. The remaining buttons for the characters "Q", "W", "R", "U", "I", "O", "A", "D", "F", "H", "K", "Z", "C", "B", and "M" are displayed in an enlarged format to substantially fill the area previously occupied by the initial touch screen (FIG. 6). Note when more buttons in one row are removed, the buttons in that row will be displayed wider than the buttons in the rows where no or lesser number of characters are removed. This process may be repeated. For example, if the button for the character "U" were touched (FIG. 8), and there were no character strings for "RUQ", "RUF", "RUZ", "RUC", "RUB", and "RUM", the buttons for the characters "Q", "F", "Z", "C", "B", and "M" are removed as shown in FIG. 9. The remaining buttons for the characters "W", "R", "U", "I", "O", "A", "D", "H", and "K" are displayed in an enlarged format to substantially fill the area occupied by the former displayed version of the touch screen (FIG. 8). Note that when all of the buttons are removed from a row, the displayed height of the buttons in the other rows is increased that uses space previously occupied by the removed row.

Figure 10:
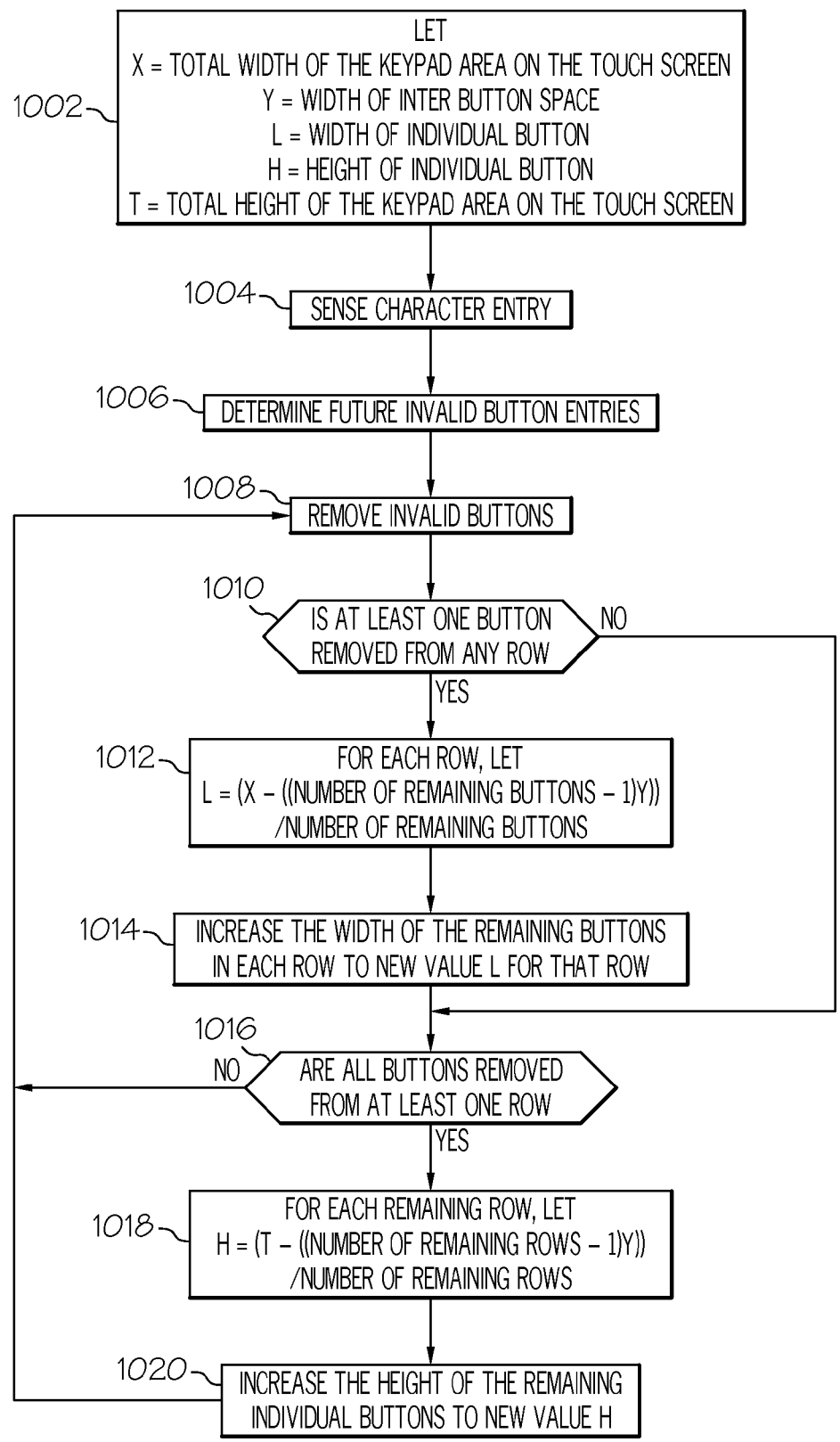
FIG. 10 is a flow chart of the algorithm for determining the modifications of FIGS. 8 and 9.

A determination of the displayed size of the buttons in the above described embodiment may be made 1002 by use of the following exemplary algorithm (FIG. 10), where X=total width of keypad area on the touch screen,
Y=width of inter-button space,
L=width of individual button,
H=height of individual button,
T=total height of the keypad area on the touch screen.

The steps of the algorithm include sensing 1004 a character entry (touching of a button), determining 1006 future invalid button entries (non-existent character string), removing 1008 the invalid buttons, and if at least one button is removed 1010 from any row, let 1012 L=(X−((NUMBER OF REMAINING BUTTONS−1)Y))/NUMBER OF REMAINING BUTTONS for each row and increasing 1014 the width of the remaining buttons in each row to the new value L for that row. Subsequent to step 1014, or if step 1010 is a NO, and not all buttons are removed 1016 from at least one row, step 1008 is repeated.

If all buttons are removed 1016 from at least one row, for each remaining row 1018, let H=(T−((NUMBER OF REMAINING ROWS−1)Y))/NUMBER OF REMAINING ROWS. The height of the remaining individual buttons are then increased 1020 to the new value H.

Therefore, it has been shown that selected characters not existing in a list of possible available character strings are removed from the touch screen key pad and the space occupied by the remaining characters on the key pad are displayed in an enlarged area with larger fonts for making their recognition and selection by a user much easier and more reliable.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A method for enlarging a plurality of selectable characters displayed on a plurality of buttons on an adaptive touch screen key pad within an aircraft during an entry of a plurality of desired characters, comprising:
　　detecting a touch of a button displaying at least one of the selectable characters, the buttons being provided in a sequence respective to the at least one character displayed thereon;
　　determining by a processor coupled to the key pad the size and position of the selectable characters to be displayed including:
　　　　creating at least one character substring, one for each of the at least one selectable characters displayed on the touched button;
　　　　comparing the at least one character substring with a plurality of character strings;
　　　　identifying the character strings as invalid that do not contain the at least one character substring; and
　　　　deterministically and permanently removing, during the entry of the desired characters the selectable characters on the touch screen included in the invalid character strings that are not contained in the at least one character substring; and
　　displaying in an enlarged format at least some of the buttons remaining on the touch screen, wherein the buttons remaining are provided in the sequence and are configured to maximize space utilization, wherein X is the total width of the key pad, Y is the width of inter-button space, L is the width of individual buttons, H is the height of individual buttons, and T is the height of the key pad, and wherein the enlarging step comprises determining sizes to which the format of the remaining buttons are enlarged by the steps comprising:
　　(a) if no buttons are removed from any rows, go to (c), otherwise go to step (b);
　　(b) if at least one button is removed from any row, let L=(X−((number of remaining buttons−1)Y))/number of remaining buttons, and increase the width of the remaining buttons in each row to a new value L for that row;

(c) if not all buttons are removed from at least one row, go to step (e);

(d) if all buttons are removed from at least one row, for each remaining row, let H=(T−((number of remaining rows−1)Y))/number of remaining rows, and increase the height of the remaining individual buttons to the new value H; and (e) repeating from the detecting step.

2. The method of claim 1 wherein the creating step comprises appending the selectable characters to an already existing substring.

3. The method of claim 1, wherein the buttons each comprise a unique plurality of the selectable characters, the removing step comprising removing at least one selectable character from at least one button; and the enlarging step comprising enlarging the selectable characters remaining on the button.

4. The method of claim 1, wherein each button comprises at least one touch sensitive region, each of the touch sensitive regions unique to one of the selectable characters, further comprising:

modifying the touch sensitive regions for a period of time for the selected characters included in the invalid character string subsequent to the identifying step and prior to the removing step.

5. The method of claim 1, wherein the button displays one character, wherein the removing step comprises removing the button, and wherein the displaying step comprises displaying at least one of the remaining plurality of buttons in an enlarged format.

6. The method of claim 5, wherein the removing step comprises removing a button from a row of buttons and the enlarging step comprises increasing widths of remaining buttons in the row.

7. The method of claim 5, wherein the removing step comprises removing a row of buttons containing the identified selectable characters from a plurality of rows of buttons, and the enlarging step comprises enlarging heights of remaining buttons.

8. A method for enlarging selectable characters displayed on an adaptive touch screen key pad within an aircraft during an entry of desired characters, comprising:

determining at least one character selected from the touch screen key pad by a touch, wherein the characters comprise a sequence;

creating at least one character substring, one for each of the at least one selected character;

identifying characters on the touch screen key pad included in a list of strings not included within the at least one character substring;

deterministically and permanently removing the identified characters from the touch screen key pad; and displaying in an enlarged format and in the sequence at least some of the characters remaining on the touch screen key pad to maximize space utilization, wherein X is the total width of the touch screen key pad, Y is the width of inter-button space, L is the width of individual buttons, H is the height of individual buttons, and T is the height of the touch screen, and wherein the enlarging step comprises determining sizes to which the format of the remaining buttons are enlarged by the steps comprising:

(a) if no buttons are removed from any rows, go to (c);

(b) if at least one button is removed from any row, let L=(X−((number of remaining buttons−1)Y))/number of remaining buttons, and increase the width of the remaining buttons in each row to a new value L for that row;

(c) if not all buttons are removed from at least one row, go to step (d);

(d) if all buttons are removed from at least one row, for each remaining row, let H=(T−((number of remaining rows−1)Y))/number of remaining rows, and increase the height of the remaining individual buttons to the new value H; and (e) repeating from the detecting step.

9. The method of claim 8, wherein each of a unique plurality of the characters comprise one of a plurality of buttons; the removing step comprising removing at least one character from at least one button; and the enlarging step comprising enlarging the characters remaining on the button.

10. The method of claim 9, wherein each button comprises at least one touch sensitive region, each of the touch sensitive regions unique to one of the selectable characters, further comprising:

modifying the touch sensitive regions containing the identified characters on the touch screen for a period of time subsequent to the identifying step and prior to the removing step.

11. The method of claim 9, wherein the button displays only one character, wherein the removing step comprises removing the button, and wherein the enlarging step comprises enlarging at least one of the remaining plurality of buttons.

12. The method of claim 11, wherein the removing step comprises removing a button from a row of buttons and the enlarging step comprises increasing widths of the remaining buttons in the row.

13. The method of claim 11, wherein the removing step comprises removing a row of buttons containing the identified selectable characters from a plurality of rows of buttons, and the enlarging step comprises enlarging heights of the remaining buttons.

14. A system for displaying characters on a key pad, comprising:

a touch screen configured to display the key pad within an aircraft;

a processor configured to:

display a plurality of buttons in the key pad during entry of a plurality of desired characters, each button containing at least one touch sensitive region, each touch sensitive region displaying at least one character, the characters comprising a sequence;

sense the selection of one of the touch sensitive regions;

determine which character strings in a list of stored character strings include the character displayed on the selected touch sensitive region selected;

deterministically and permanently remove, during the entry of the desired characters touch sensitive regions displaying characters not included in the character strings; and display other touch sensitive regions remaining on the touch screen in an enlarged format and in the sequence to maximize space utilization, wherein X is the total width of the touch screen key pad, Y is the width of inter-button space, L is the width of individual buttons, H is the height of individual buttons, and T is the height of the touch screen, and wherein the enlarging step comprises determining sizes to which the format of the remaining buttons are enlarged by the steps comprising:

(a) if no buttons are removed from any rows, go to (c);

(b) if at least one button is removed from any row, let L=(X−((number of remaining buttons−1)Y))/number of remaining buttons, and increase the width of the remaining buttons in each row to a new value L for that row;

(c) if not all buttons are removed from at least one row, go to step (d);

(d) if all buttons are removed from at least one row, for each remaining row, let H=(T−((number of remaining rows−1)Y))/number of remaining rows, and increase the height of the remaining individual buttons to the new value H; and (e) repeating from the detecting step.

15. The system of claim 14 wherein the buttons each comprise a plurality of touch sensitive regions, each of the touch sensitive regions displaying a unique character, wherein the processor is further configured to:

display the remaining touch sensitive regions on the button in an enlarged format.

16. The system of claim 14 wherein each button displays one of the plurality of characters, and the processor is further configured to:

remove buttons displaying characters not included in the character strings; and display the remaining buttons in an enlarged format.

* * * * *